United States Patent [19]

Knaak

[11] Patent Number: 4,522,073
[45] Date of Patent: Jun. 11, 1985

[54] MAGNETIC-INDUCTIVE FLOW METER FOR HIGH TEMPERATURES

[75] Inventor: Joachim Knaak, Bergisch-Gladbach, Fed. Rep. of Germany

[73] Assignee: INTERATOM Internationale Atomreaktorbau GmbH, Bergisch-Gladbach, Fed. Rep. of Germany

[21] Appl. No.: 556,628

[22] Filed: Nov. 30, 1983

[30] Foreign Application Priority Data

Dec. 1, 1982 [DE] Fed. Rep. of Germany ....... 3244473

[51] Int. Cl.³ .................................................. G01F 1/58
[52] U.S. Cl. .................................................. 73/861.12
[58] Field of Search .......................... 73/861.12–861.17

[56] References Cited

U.S. PATENT DOCUMENTS 2,766,621 10/1956 Raynsford et al. .............. 73/861.12
3,334,518 8/1967 Miyamichi ....................... 73/861.12

FOREIGN PATENT DOCUMENTS 1121347 1/1962 Fed. Rep. of Germany ... 73/861.12
271042 8/1970 U.S.S.R. ........................... 73/861.12

Primary Examiner—Charles A. Ruehl
Attorney, Agent, or Firm—Herbert L. Lerner; Laurence A. Greenberg

[57] ABSTRACT

A magnetic-inductive flow meter, includes a pipe section for carrying fluid flowing in a given direction, insulation in the form of a ceramic tube disposed loosely inside of the pipe section, magnet coils disposed on the outside of the pipe section for producing a magnetic field in the pipe section perpendicular to the given flow direction, at least two electrodes disposed inside the pipe, holding pieces wedged against the ceramic tube for securing the ceramic tube against rotation, and leads connected to the electrodes and disposed inside the ceramic tube, the leads being extended through the pipe section beyond an end of the ceramic tube.

3 Claims, 3 Drawing Figures

MAGNETIC-INDUCTIVE FLOW METER FOR HIGH TEMPERATURES

The invention relates to a magnetic-inductive flow meter for high temperatures and poorly electrically conducting liquids. Magnetic-inductive flow meters have been used in engineering for a long time. Due to Lorenz forces, a magnetic field oriented perpendicularly to a flowing liquid causes a voltage to be built up in the flowing liquid which is perpendicular to the direction of the magnetic field and to the direction of the flow. For a given magnetic field, this voltage is proportional to the volumetric flow of the liquid. It is conventional to measure this voltage by means of electrodes and to construct flow meters according to this system.

In a brochure of the firm Fischer and Porter GmbH, Göttingen (Cat. 1.2, 1982), newer flow meters based on this principle are described. In order to avoid electro-chemical processes, these flow meters are not operated with a constant magnetic field, but instead with a-c current or pulsating d-c current. In the case of poorly electrically conducting liquids, a further problem must be considered. A metallic pipeline would short the voltage produced in the liquid and make a measurement impossible. Therefore, magnetic-inductive flow meters for poorly electrically conducting liquids must have a section of pipe which is electrically insulated on the inside in vicinity of the magnetic field. The electrodes must also be brought through the wall of the pipe section in an insulated manner and through the insulation into the interior, where they come into contact with the liquid. The above-mentioned brochure discloses flow meters for poorly electrically conductive liquids which operate in accordance with this principle and are covered on the inside thereof with rubber, plastic or ceramic. However, this structure has an upper limit with respect to the maximum measurement material temperature, which is in the range of 180° C. For higher temperatures, it has not been possible heretofore to satisfactorily solve the problems which result from lack of temperature stability of the lining or different coefficients of expansion of the pipe section and the lining, as well as from the tight feedthrough of the electrode leads.

It is accordingly an object of the invention to provide a magnetic-inductive flow meter for high temperatures, which overcomes the hereinafore-mentioned disadvantages of the heretofore-known devices of this general type, which can be used at substantially higher temperatures, and which is suitable for poorly electrically conducting liquids.

With the foregoing and other objects in view there is provided, in accordance with the invention, a magnetic-inductive flow meter, comprising a pipe section for carrying fluid flowing in a given direction, insulation in the form of a ceramic tube disposed loosely inside of the pipe section, i.e. with a little play, magnet coils disposed on the outside of the pipe section for producing a magnetic field in the pipe section perpendicular to the given flow direction, at least two electrodes disposed inside the pipe, holding pieces wedged against the ceramic tube for securing the ceramic tube against rotation, and leads connected to the electrodes and disposed inside the ceramic tube, the leads being extended through the wall of the pipe section beyond an end of the ceramic tube.

The problems described above are solved by the provision that the insulation is no longer a layer which is firmly connected to the inside of the pipe section, but as a whole, a ceramic tube is inserted into the pipe section with a little play and is wedged to the pipe section in such a way as to be secured against rotation. Since there is no firm connection between the pipe section and the ceramic tube, breaks and damage to the insulation cannot occur, even in the case of different thermal expansion. In addition, feedthroughs in the ceramic tube are dispensed with entirely and instead, the leads of the electrodes are installed on the inside of the ceramic tube up to the end of the tube and are only then brought through the wall of the pipe section. Since it is not a problem to bring lines through a metallic wall, the risks mentioned above are avoided in this manner.

A basic feature of this new structure is the insight that penetration of liquid between the ceramic tube and the wall of the pipe section has no adverse affect on the measurement. The decisive factor is to only ensure that no short circuit can occur by way of the pipe wall at the point of the induced voltage.

In accordance with another feature of the invention, there is provided a ceramic jacket insulating the leads in vicinity of the ceramic tube, the leads including a transition section at the end of the ceramic tube, and mineral-insulated jacketed measuring conductors adjacent the transition section from the transition system on, the measuring conductors being tightly welded to the wall of the pipe section where the leads are extended through the pipe section. The use of mineral-insulated jacketed measurement conductors is particularly advantageous because it is relatively easy to make tight feedthroughs with jacketed measurement conductors through metal walls. However, this type of insulation cannot be used in the interior of the ceramic tube, since at that location the metallic jacket would again cause the short-circuit currents which are to be avoided by the structure of the invention.

In the interior of the ceramic tube, small ceramic tubes or a ceramic compound are therefore used for insulating the electrode leads.

In accordance with a concomitant feature of the invention, the magnet coils are highly temperature-resistant coils. This permits the formation of a compact structure of the flow meter without the need for cooling the coils separately or for placing them distant from the pipeline. Highly temperature-resistant coils have heretofore been used in electromagnetic induction pumps, for instance.

Other features which are considered as characteristic for the invention are set forth in the appended claims.

Although the invention is illustrated and described herein as embodied in a magnetic-inductive flow meter for high temperatures, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
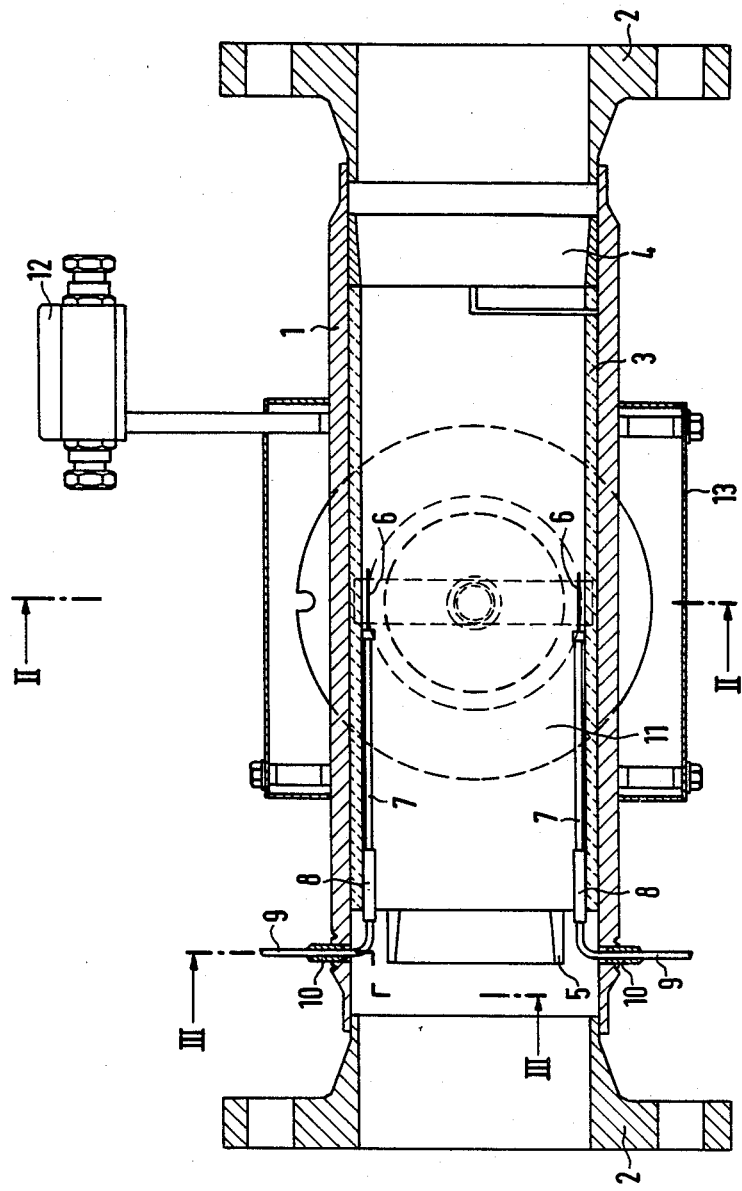
FIG. 1 is a longitudinal-sectional view of a flow meter according to the invention.

Referring now to the figures of the drawing in detail and first particularly to FIG. 1 thereof, there is seen a section of pipe 1 which is provided at both ends thereof with flanges 2. A ceramic tube 3 is placed quasi loosely in the interior of the pipe section 1. This ceramic tube 3 is wedged at the ends thereof by slightly conical holding pieces 4 and 5 which are welded in, and it is fastened so as to be secure against rotation by meshing engagement with the holding piece 4. The holding pieces 5 are non-rotational, symmetrical parts, but they support the ceramic tube 3 in such a way as to leave space for the installation of lines between them. Electrodes 6 are disposed in the interior of the ceramic tube 3. The electrodes 6 have leads which are installed along the inside of the ceramic tube 3. The leads have a first piece 7 which is insulated by means of a small ceramic tube up to a transition 8 at the end of the ceramic tube 3. After the transition 8, the leads are continued in mineral-insulated jacketed measuring conductors 9. These jacketed measuring conductors are tightly welded by welds 10 at feed-throughs passing through the wall of the pipe section 1. The position of coils 11 is indicated by broken lines in FIG. 1 and is seen more clearly in FIG. 2. These coils are accomodated in a housing fastened to the pipe section 1. A terminal box 12 for accomodating the electrical terminals is likewise fastened to the pipe section.

Figure 2:
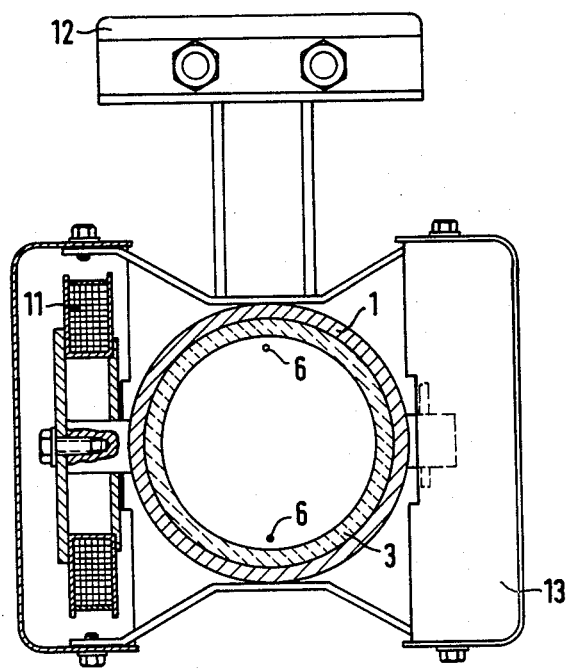
FIG. 2 is a cross-sectional view taken along the line II—II of FIG. 1 in the direction of the arrows.

FIG. 2 shows a section through a flow meter according to the invention, taken along the line II—II in FIG. 1. The highly temperature-resistant coils 11 and the magnet cores are disposed and protected in the housing 13 on both sides of the pipe section 1. Materials with a high Curie point are used as the magnet laminations.

Figure 3:
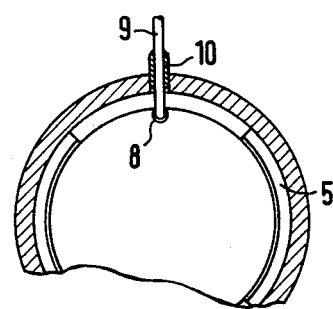
FIG. 3 is a fragmentary cross-sectional view taken along the line III—III of FIG. 1, in the direction of the arrows.

FIG. 3 shows a section through FIG. 1, taken along the line III—III. The holding pieces 5, which are of conical shape, are welded to the pipe section 1 and secure the ceramic tube 3 in its position. Space remains between the holding pieces 5, for installing the jacketed measuring conductors 9 which are brought through the tube wall in vicinity of the holding pieces 5 and are welded to the tube wall at welds 10.

The foregoing is a description corresponding in substance to German Application No. P 32 44 473.7, dated Dec. 1, 1982, the International priority of which is being claimed for the instant application, and which is hereby made part of this application. Any material discrepancies between the foregoing specification and the aforementioned German application are to be resolved in favor of the latter.

I claim:

1. Magnetic-inductive flow meter, comprising a pipe section for carrying fluid flowing in a given direction, insulation in the form of a ceramic tube disposed loosely inside of said pipe section, magnet coils disposed on the outside of said pipe section for producing a magnetic field in said pipe section perpendicular to the given flow direction, at least two electrodes disposed inside said pipe, holding pieces wedged against said ceramic tube for securing said ceramic tube against rotation, and leads connected to said electrodes and disposed inside said ceramic tube, said leads being extended through said pipe section beyond an end of said ceramic tube.

2. Flow meter according to claim 1, including a ceramic jacket insulating said leads in vicinity of said ceramic tube, said leads including a transition section at the end of said ceramic tube, and mineral-insulated jacketed measuring conductors adjacent said transition section, said measuring conductors being tightly welded to said pipe section where said leads are extended through said pipe section.

3. Flow meter according to claim 1, wherein said magnet coils are highly temperature-resistant coils.

* * * * *